(No Model.)
B. RICHORDS.
COPPER SMELTING FURNACE.
No. 475,609. Patented May 24, 1892.
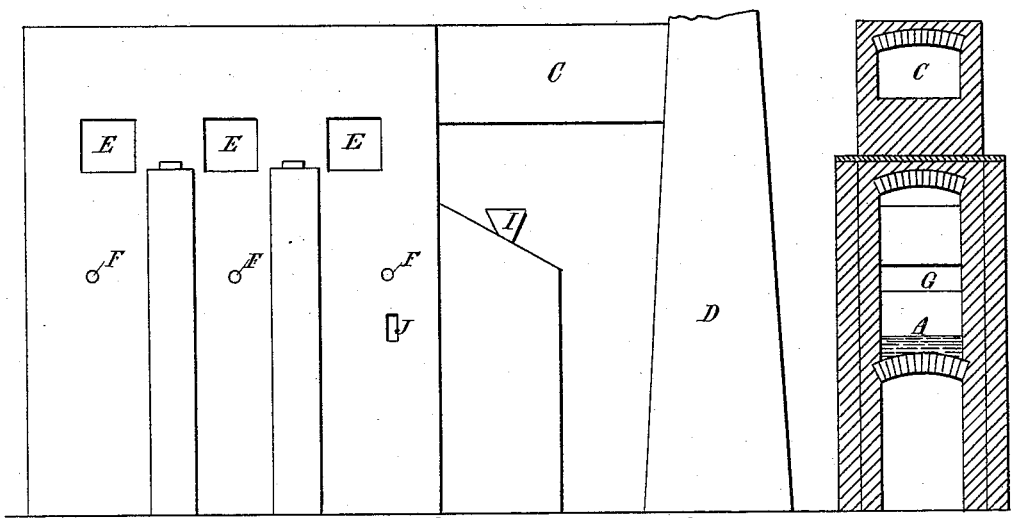
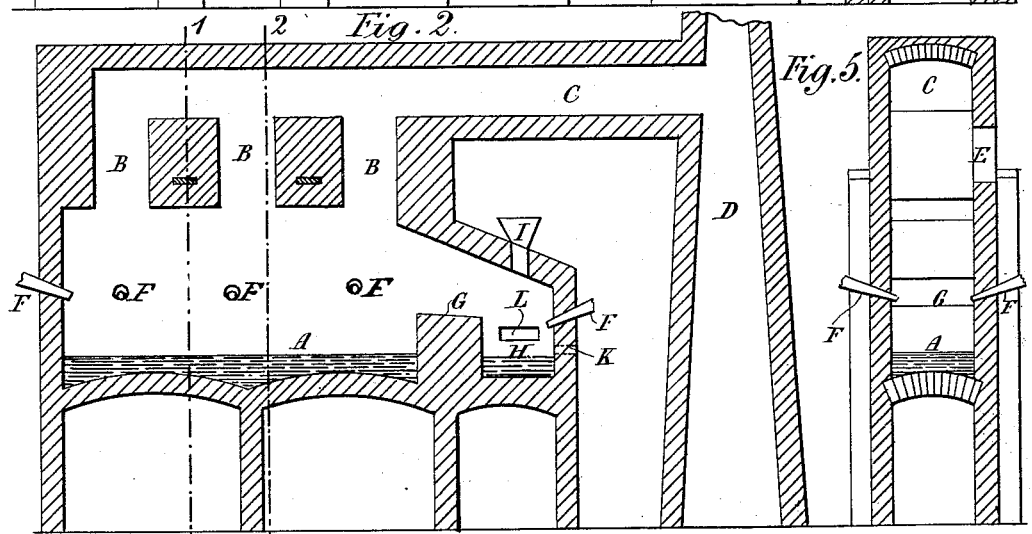
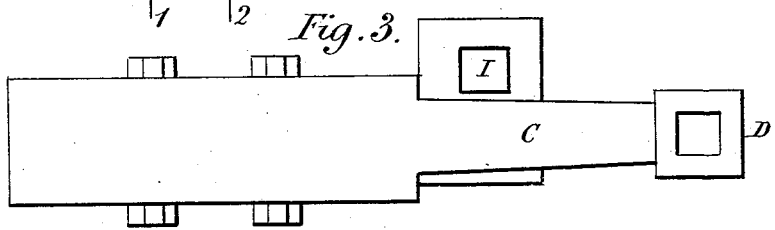
Witnesses.
P. Washington Miller
Baltus De Long
Inventor.
Benjamin Richords
By his Atty's.
Baldwin, Davidson & Wight.
THE NORRIS PETERS CO., PHOTO-LITHO., WASHINGTON, D. C.

UNITED STATES PATENT OFFICE.

BENJAMIN RICHORDS, OF MIDDLE BANK, SWANSEA, ENGLAND.

COPPER-SMELTING FURNACE.

SPECIFICATION forming part of Letters Patent No. 475,609, dated May 24, 1892.

Application filed November 3, 1891. Serial No. 410,751. (No model.)

*To all whom it may concern:*

Be it known that I, BENJAMIN RICHORDS, manager in copper-works, a subject of the Queen of Great Britain, residing at Middle Bank, Swansea, Wales, have invented certain new and useful Improvements in Furnaces for Smelting Copper and other Ores, of which the following is a specification.

The preliminary smelting of ores, slags, and other materials is commonly effected either in reverberatory furnaces, as in the well-known Welsh process of copper-smelting, or in cupola-furnaces fed with fuel and ore at the top and supplied below with air-blast introduced through tuyeres, as is well understood. The metal obtained from this preliminary smelting is after calcination raised to a higher degree of purity by further smelting and roasting. If it is attempted to carry the preliminary smelting beyond a comparatively low limit too large a proportion of metal is carried off with the slag and either wasted or else a subsequent remelting of the slags is rendered necessary.

According to my invention I make a smelting-furnace with a bridge at one end dividing it into two compartments. Slag flows directly over the bridge from the first or larger compartment into the second or smaller compartment. I make provision for drawing off metal from the first and both slag and metal from the second compartment, so that the rich slag coming from the first compartment may be cleaned in the second and a perfectly clean slag obtained from the whole process. Preferably I make the furnace of an oblong form in plan with a number of openings for feeding at intervals along the upper part and tuyeres for admission of air along the sides and along the top, so that it resembles in shape a number of ordinary square cupolas or pillars set in a row side by side with the division-walls between them partly removed, so that they are all open one to another in the lower part of the furnace. The bottom I make to slope slightly to one end. The rich molten metal collects on this bottom and can be drawn off from the lower end, while the slag containing some copper passes from this end through an overflow-opening into the second compartment of the furnace. This compartment is in form like a rectangular cupola and answers much the same purpose, for there the overflowing slag is mixed with a further quantity of fuel and of inferior ore or slag, or both, admitted through a hopper at the top, and is further purified before finally leaving the furnace. With a careful arrangement of the blast and the mixtures the fuel in the second compartment may be reduced or even dispensed with altogether, the waste heat from the larger compartment being sufficient to smelt the ore and slag in the smaller. By forming the furnace in the above way there is a great saving in fuel, while at the same time a greater heat may be maintained, the smelting effected more rapidly, and the metal raised to a higher degree of purity than is practicable with any single smelting-furnace at present used. The resulting slags also are sufficiently free from metal to render their further purification unnecessary. My furnace thus takes the place of the ordinary ore-furnace, whether reverberatory or cupola, and of the metal-furnace and metal-roaster.

Figure 1 is a side elevation; Fig. 2, a vertical longitudinal section, and Fig. 3 a plan, of a furnace constructed as above described. Fig. 4 is a vertical cross-section on the line 1 1, Fig. 2; and Fig. 5 a vertical cross-section on the line 2 2.

A is the main bed of the larger compartment of the furnace, of an oblong form.

B B B are openings through the arched roof of the furnace into an outlet-flue C, which leads to a chimney D.

E E E are openings at one side of the furnace leading into the openings B. Through these fuel and ore can be fed down onto the furnace-bed.

F F are tuyeres through which air-blast can be supplied to the interior of the furnace.

G is a bridge at the lower end of the oblong bed A.

H is a short bed on the opposite side of the bridge in the smaller compartment of the furnace.

I is a charging-hole through the roof, which is above this bed.

J is a tapping-hole by which molten metal can be drawn off above the main bed A.

K is a tapping-hole by which metal can be drawn off from above the bed H.

L is an opening through which slag is allowed to flow away from above this bed.

It is not essential that the furnace should be of an oblong form, as a furnace either of a circular or square form will do for the purpose; but I believe an oblong furnace to be the best.

In the larger compartment of the furnace the charge consists of fuel and a mixture of calcined and raw ores in which the proportion of iron and other basic material to silica is rather more than two to one, only sufficient sulphur being retained to make a rich regulus on smelting. The chemical reactions are as follows: The oxide and poor sulphide of copper combine to form a rich regulus, which contains, also, the sulphide of iron left undecomposed by calcination. The oxide of iron formed by calcination, and other basic materials—such as lime, alumina, magnesia, &c.—combine with the silica in the charge to form a fusible slag containing some copper varying in amount with the richness of the regulus made. This slag flows into the smaller compartment of the furnace, where it meets with an easily-fusible mixture of poor copper ores rich in sulphur. The sulphur in this mixture decomposes the combined copper in the slag from the larger compartment of the furnace and forms a coarse metal, which sinks into the well of the smaller compartment of the furnace, while the slag thus deprived of its copper flows away clean.

What I claim is—

1. A smelting-furnace with a bridge at one end dividing it into two compartments and over which slag flows directly from the larger compartment to the smaller compartment, the larger compartment of said furnace being provided with means for drawing off metal and the second compartment being provided with means for drawing off separately metal and slag, both compartments having tuyeres for directing blasts of air into them, substantially as described.

2. A cupola smelting-furnace divided at the bottom into two compartments by a bridge, one for smelting ore, the other for recovering copper from the slag, said furnace being formed with an outlet to the chimney at the top of the smelting-chamber, an opening above the bridge for gases from the second compartment to pass to the chimney-opening, tuyeres for directing blasts of air into both chambers, openings for drawing off metal from the lower part of both compartments, and a passage at the bridge for slag produced in the first compartment to flow to the second compartment, and a slag-outlet for this compartment, substantially as described.

3. A smelting-furnace comprising two compartments separated by a bridge, the larger of said compartments being provided with an outlet-flue and charging-openings at intervals along the top and having an outlet J for drawing off metal, the smaller of said compartments having an outlet for slag and an outlet for metal and having also a charging-opening, both of said compartments being provided with tuyeres for directing blasts of air, substantially as described.

BENJAMIN RICHORDS.

Witnesses:
JOHN W. PACKE,
G. E. TAYLOR.

Affidavit having been filed showing that the name of the patentee in Letters Patent No. 475,609, granted May 24, 1892, for an improvement in "Copper-Smelting Furnaces," should have been written and printed *Benjamin Richards*, instead of "Benjamin Richords," it is hereby certified that the proper correction has been made in the files and records pertaining to the case in the Patent Office, and should be read in the Letters Patent that the same may conform thereto.

Signed, countersigned, and sealed this 5th day of July, A. D. 1892.

[SEAL.]

GEO. CHANDLER,
*First Assistant Secretary of the Interior.*

Countersigned:

N. L. FROTHINGHAM,
*Acting Commissioner of Patents.*